United States Patent
Ikeda et al.

(10) Patent No.: US 11,407,686 B2
(45) Date of Patent: Aug. 9, 2022

(54) FERRITE SINTERED MAGNET

(71) Applicant: TDK Corporation, Tokyo (JP)

(72) Inventors: Masanori Ikeda, Tokyo (JP); Hiroyuki Morita, Tokyo (JP); Yoshitaka Murakawa, Tokyo (JP); Shogo Muroya, Tokyo (JP)

(73) Assignee: TDK Corporation, Tokyo (JP)

( * ) Notice: Subject to any disclaimer, the term of this patent is extended or adjusted under 35 U.S.C. 154(b) by 352 days.

(21) Appl. No.: 16/782,343

(22) Filed: Feb. 5, 2020

(65) Prior Publication Data

US 2020/0255339 A1 Aug. 13, 2020

(30) Foreign Application Priority Data

Feb. 7, 2019 (JP) ............... JP2019-020763

(51) Int. Cl.
  *C04B 35/26* (2006.01)
  *H01F 1/11* (2006.01)
  *H01F 41/02* (2006.01)
  *C01G 51/00* (2006.01)
  *H01F 1/10* (2006.01)
  *H02K 1/02* (2006.01)

(52) U.S. Cl.
  CPC .......... *C04B 35/2633* (2013.01); *C01G 51/70* (2013.01); *H01F 1/10* (2013.01); *H01F 1/11* (2013.01); *H01F 41/0266* (2013.01); *C01P 2002/50* (2013.01); *C01P 2002/76* (2013.01); *C01P 2004/04* (2013.01); *C01P 2006/42* (2013.01); *C04B 2235/3217* (2013.01); *C04B 2235/3274* (2013.01); *C04B 2235/3409* (2013.01); *C04B 2235/767* (2013.01); *H02K 1/02* (2013.01)

(58) Field of Classification Search
  CPC ........ C04B 13/2633; C04B 2235/3217; C04B 2235/3274; C04B 2235/3409; C04B 2235/767; H01F 1/10; C01P 2002/76; C01P 2006/42
  See application file for complete search history.

(56) References Cited

U.S. PATENT DOCUMENTS

| | | | |
|---|---|---|---|
| 6,248,253 B1 * | 6/2001 | Taguchi | H01F 1/10 252/62.63 |
| 2006/0284136 A1 | 12/2006 | Takami et al. | |
| 2009/0218540 A1 | 9/2009 | Takami et al. | |
| 2012/0105185 A1 | 5/2012 | Oda et al. | |
| 2012/0161910 A1 | 6/2012 | Nagaoka et al. | |
| 2012/0280167 A1 | 11/2012 | Yanagida et al. | |
| 2015/0332819 A1 | 11/2015 | Oda et al. | |
| 2017/0207011 A1 | 7/2017 | Morita | |

FOREIGN PATENT DOCUMENTS

| CN | 1849675 A | 10/2006 |
|---|---|---|
| WO | WO-2011/004791 A1 | 1/2011 |

* cited by examiner

*Primary Examiner* — C Melissa Koslow
(74) *Attorney, Agent, or Firm* — Faegre Drinker Biddle & Reath LLP

(57) ABSTRACT

This ferrite sintered magnet comprises metallic elements at an atomic ratio represented by formula (1):

$$Ca_{1-w-x}R_wSr_xFe_zCo_m \quad (1)$$

in formula (1), R is at least one element selected from the group consisting of rare-earth elements and Bi, and R comprises at least La, in formula (1), w, x, z and m satisfy formulae (2) to (5):

$$0.360 \leq w \leq 0.420 \quad (2)$$

$$0.110 \leq x \leq 0.173 \quad (3)$$

$$8.51 \leq z \leq 9.71 \quad (4)$$

$$0.208 \leq m \leq 0.269 \quad (5), \text{ and}$$

in a section parallel to an axis of easy magnetization, when the number of total ferrite grains is N and the number of ferrite grains having a stacking fault is n, $0 \leq n/N \leq 0.20$ is satisfied.

4 Claims, 2 Drawing Sheets

FERRITE SINTERED MAGNET

TECHNICAL FIELD

The present invention relates to a ferrite sintered magnet.

BACKGROUND

A hexagonal M type (magnetoplumbite type) Sr ferrite or Ba ferrite is known as a raw material of permanent magnets made of oxides. Ferrite magnets comprising these ferrites are presented as permanent magnets in the form of ferrite sintered magnets or bonded magnets. With the downsizing of electronic components and enhancement in their performance in recent years, ferrite magnets are also being required to have high magnetic properties in spite of the small size thereof.

As indices of magnetic properties of permanent magnets, residual magnetic flux density (Br) and coercive force (HcJ) are generally used, and it is estimated that as they become higher, permanent magnets have higher magnetic properties. Until now, from the viewpoint of improving the Br and the HcJ of permanent magnets, examination has been performed by changing the composition, such as by incorporating specific elements into ferrite magnets.

For example, in Patent Literature 1, a hexagonal ferrite sintered magnet to which various elements are added is disclosed.

Citation List

[Patent Literature 1] WO2011/004791

SUMMARY

As mentioned above, there have been various attempts of changing combinations of added elements, but it has not been revealed yet what combinations of additional elements give high coercive force. Especially when a combination of elements wherein the valences and ion radii are greatly different from each other, such as a combination of Co and a rare-earth element such as La, is added, the coercive force may not be enough.

The present invention has been completed in light of the above-mentioned circumstances, and an object thereof is to provide a ferrite magnet which is excellent in coercive force.

The present invention is a ferrite sintered magnet comprising ferrite grains having a hexagonal structure. This ferrite sintered magnet comprises metallic elements at an atomic ratio represented by formula (1).

$$Ca_{1-w-x}R_wSr_xFe_zCo_m \quad (1)$$

In formula (1), R is at least one element selected from the group consisting of rare-earth elements and Bi, and R comprises at least La, and
in formula (1), w, x, z and m satisfy formulae (2) to (5).

$$0.360 \leq w \leq 0.420 \quad (2)$$

$$0.110 \leq x \leq 0.173 \quad (3)$$

$$8.51 \leq z \leq 9.71 \quad (4)$$

$$0.208 \leq m \leq 0.269 \quad (5)$$

In a section parallel to an axis of easy magnetization, when the number of total ferrite grains is N and the number of ferrite grains having a stacking fault is n, $0 \leq n/N \leq 0.20$ is satisfied.

This magnet is excellent especially in coercive force.

The above-mentioned ferrite sintered magnet can further comprise 0.03 to 0.3% by mass of Al in terms of $Al_2O_3$. The ferrite sintered magnet comprises Al in the above-mentioned range, which can further improve the HcJ.

The above-mentioned ferrite sintered magnet can comprise 0.037 to 0.181% by mass of B in terms of $H_3BO_3$.

The grain growth of the sintered body is suppressed thereby, and there is the effect of further improving the Hcj by reducing the primary particle size. The magnetic interaction between ferrite grains is suppressed by forming grain boundary phases comprising B homogeneously, and a decrease in Hcj can be suppressed.

According to the present invention, a ferrite sintered magnet which is excellent in coercive force can be provided.

DETAILED DESCRIPTION

Figure 1:
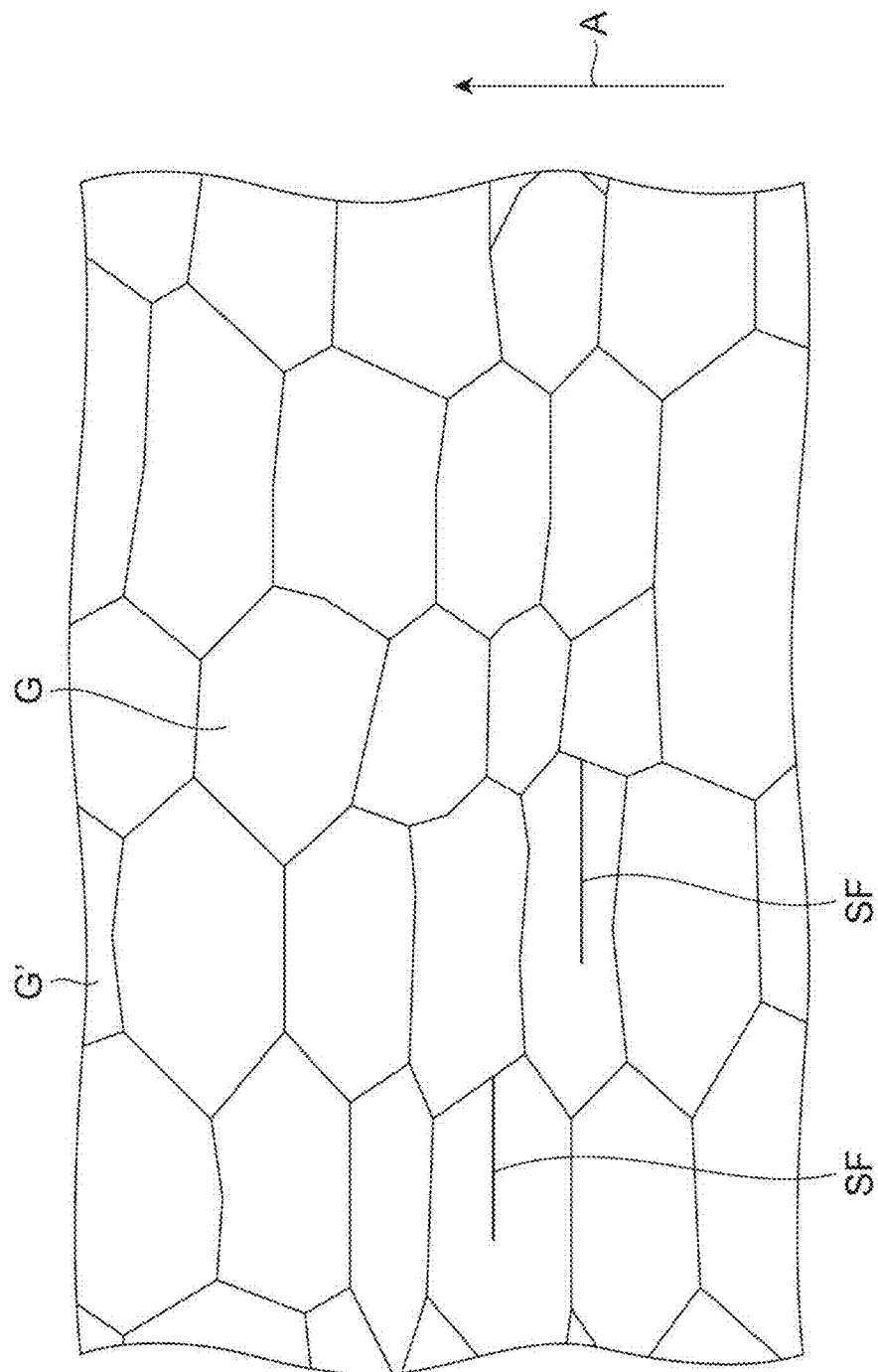
FIG. 1 is a schematic diagram of a section parallel to the axis of easy magnetization of a ferrite magnet according to an embodiment of the present invention, and the axis of easy magnetization is the vertical direction A of the figure.

Suitable embodiments of the present invention will be described hereinafter. However, the present invention is not limited to the following embodiments.

Ferrite Sintered Magnet

A ferrite sintered magnet according to the present embodiment comprises ferrite grains which have a hexagonal structure. It is preferable that the above-mentioned ferrite be a magnetoplumbite type ferrite (M type ferrite).

The ferrite sintered magnet according to the present embodiment is an oxide comprising metallic elements at an atomic ratio represented by formula (1).

$$Ca_{1-w-x}R_wSr_xFe_zCo_m \quad (1)$$

In formula (1), R is at least one element selected from the group consisting of rare-earth elements (including Y) and Bi, and R comprises at least La.

Additionally, in formula (1), w, x, z and m satisfy formulae (2) to (5). Since the w, the x, the z and the m satisfy formulae (2) to (5), the ferrite sintered magnet can have stable excellent residual magnetic flux density Br and coercive force HcJ.

$$0.360 \leq w \leq 0.420 \quad (2)$$

$$0.110 \leq x \leq 0.173 \quad (3)$$

$$8.51 \leq z \leq 9.71 \quad (4)$$

$$0.208 \leq m \leq 0.269 \quad (5)$$

It is preferable that the coefficient (1-w-x) of Ca at the atomic ratio of the metallic elements in the ferrite sintered magnet according to the present embodiment be more than 0.435 and less than 0.500. When the coefficient (1-w-x) of Ca is more than 0.435, a ferrite is easily formed into an M type ferrite. The ratios of nonmagnetic phases such as α-$Fe_2O_3$ are not only reduced, but R tends to be able to suppress the production of nonmagnetic different phases such as orthoferrite resulting from surplus of R, and suppress deterioration in magnetic properties (especially Br or HcJ). It is more preferable that the coefficient (1-w-x) of Ca be 0.436 or more, and it is still more preferable that it be more than 0.445 from the same viewpoint. Meanwhile, when the coefficient (1-w-x) of Ca is less than 0.500, a ferrite is not only easily formed into an M type ferrite, but nonmagnetic phases such as $CaFeO_{3-x}$ are reduced, and excellent magnetic properties are easily obtained. It is more preferable that the coefficient (1-w-x) of Ca be 0.491 or less from the same viewpoint.

R at the atomic ratio of the metallic elements in the ferrite sintered magnet according to the present embodiment is at least one element selected from the group consisting of rare-earth elements and Bi, and comprises at least La. Examples of the rare-earth elements include La, Ce, Pr, Nd, Sm, Eu, Gd, Tb, Dy, Ho, Er, Tm, Yb, Lu and Y. It is preferable that the R be La. The anisotropic magnetic field can be improved when the R is La.

The coefficient (w) of the R at the atomic ratio of the metallic elements in the ferrite sintered magnet according to the present embodiment is 0.360 or more and 0.420 or less. When the coefficient (w) of the R is in the above-mentioned range, favorable Br, HcJ and squareness ratio, Hk/HcJ, can be obtained. When the coefficient (w) of the R is 0.360 or more, the solid solution amount of Co in the ferrite sintered magnet is enough, and decreases in Br and HcJ can be suppressed. It is preferable the coefficient (w) of the R be more than 0.370, and it is more preferable that it be 0.380 or more from the same viewpoint. Meanwhile, when the coefficient (w) of the R is 0.420 or less, the production of nonmagnetic different phases such as orthoferrite can be suppressed, and the ferrite sintered magnet can be made a practical one, the HcJ of which is high. It is preferable that the coefficient (w) of the R be less than 0.410 from the same viewpoint.

The coefficient (x) of Sr at the atomic ratio of the metallic elements in the ferrite sintered magnet according to the present embodiment are 0.110 or more and 0.173 or less. When the coefficient (x) of Sr is in the above-mentioned range, favorable Br, HcJ and HAW can be obtained. When the coefficient (x) of Sr is 0.110 or more, the ratio of Ca and/or La reduces, and a decrease in HcJ can be suppressed. Meanwhile, when the coefficient (x) of Sr is 0.173 or less, sufficient Br and HcJ are easily obtained. It is preferable that the coefficient (x) of Sr be less than 0.170, and it is more preferable that it be less than 0.165 from the same viewpoint.

The coefficient (z) of Fe at the atomic ratio of the metallic elements in the ferrite sintered magnet according to the present embodiment is 8.51 or more and 9.71 or less. Since the coefficient (z) of Fe is in the above-mentioned range, favorable Br, HcJ and Hk/HcJ can be obtained. It is preferable that the coefficient (z) of Fe be more than 8.70 and less than 9.40 from the viewpoint of obtaining more favorable HcJ. It is preferable that the coefficient (z) of Fe be more than 8.90 and less than 9.20 from the viewpoint of obtaining more favorable Hk/HcJ.

The coefficient (m) of Co at the atomic ratio of the metallic elements in the ferrite sintered magnet according to the present embodiment is 0.208 or more and 0.269 or less. When the coefficient (m) of Co is 0.208 or more, more excellent HcJ can be obtained. It is preferable that the coefficient (m) of Co be more than 0.210, it is more preferable that it be more than 0.220, and it is still more preferable that it be 0.250 or more from the same viewpoint.

Meanwhile, when the coefficient (m) of Co is 0.269 or less, more excellent Br can be obtained. It is preferable that the coefficient (m) of Co be 0.250 or less from the same viewpoint. The anisotropic magnetic field can be improved by incorporating Co into the ferrite sintered magnet.

The ferrite sintered magnet according to the present embodiment can further comprise Al (aluminum). It is preferable that the content of Al in a ferrite sintered magnet be 0.03% by mass or more and 0.3% by mass or less in terms of $Al_2O_3$. The grain growth at the time of calcination is suppressed, and the obtained coercive force of the ferrite sintered magnet is further improved by incorporating 0.03% by mass or more of Al into the ferrite sintered magnet in terms of $Al_2O_3$. Meanwhile, excellent Br and HcJ can be obtained by adjusting the content of Al in the ferrite sintered magnet to 0.3% by mass or less in terms of $Al_2O_3$.

The ferrite sintered magnet according to the present embodiment can comprise B (boron). A suitable content of B in the ferrite sintered magnet is 0.037% by mass or more and 0.181% by mass or less in terms of $H_3BO_3$. The dependence of HcJ on calcination temperature can be reduced by incorporating B into the ferrite sintered magnet at 0.037% by mass or more in terms of $H_3BO_3$. It is preferable that the content of B be 0.050% by mass or more, and it is more preferable that it be 0.070% by mass or more in terms of $H_3BO_3$ from the same viewpoint. Meanwhile, high HcJ can be maintained by adjusting the content of B in the ferrite sintered magnet to 0.181% by mass or less in terms of $H_3BO_3$. It is preferable that the content of B be 0.165% by mass or less, and it is more preferable that it be 0.150% by mass or less in terms of $H_3BO_3$ from the same viewpoint.

The ferrite sintered magnet according to the present embodiment can further comprise Si (silicon). The content of Si in the ferrite sintered magnet can be 0.1 to 3% by mass in terms of $SiO_2$. High HcJ is easily obtained by incorporating Si into the ferrite sintered magnet in the above-mentioned range. The content of Si may be 0.5 to 1.0% by mass in terms of $SiO_2$ from the same viewpoint.

The ferrite sintered magnet according to the present embodiment may further comprise Ba (barium). When the ferrite sintered magnet comprises Ba, the content of Ba in the ferrite sintered magnet can be 0.001 to 0.068% by mass in terms of BaO. Even though the ferrite sintered magnet comprises Ba in the above-mentioned range, the HcJ of the ferrite sintered magnet can be maintained at a high value. However, when it comprises Ba at more than 0.068% by mass in terms of BaO, the firing temperature dependence tends to decrease, and the coercive force also tends to decrease.

The ferrite sintered magnet according to the present embodiment may further comprise Cr, Ga, Mg, Cu, Mn, Ni, Zn, In, Li, Ti, Zr, Ge, Sn, V, Nb, Ta, Sb, As, W, Mo and the like. It is preferable that the content of each element be 3% by mass or less, and it is still more preferable that it be 1% by mass or less, in terms of an oxide. It is preferable that the total content of these elements be 2% by mass or less from the viewpoint of avoiding deterioration in magnetic properties.

It is preferable that the ferrite sintered magnet according to the present embodiment do not comprise alkali metal elements (Na, K, Rb and the like). Alkali metal elements tend to reduce the saturation magnetization of the ferrite sintered magnet easily. However, for example, alkali metal elements may be included in raw materials for obtaining a ferrite sintered magnet, and as long as the amounts thereof are such amounts as to be included inevitably, they may be included in the ferrite sintered magnet. The content of alkali metal elements which does not influence magnetic properties greatly is 3% by mass or less.

The composition of the ferrite sintered magnet can be measured by fluorescence X-rays quantitative analysis. The existence of the main phase can be confirmed by X-ray diffraction or electron diffraction.

The average size of ferrite grains in the ferrite sintered magnet according to the present embodiment is preferably 1.5 µm or less, more preferably 1.0 µm or less, and still more preferably 0.5 to 1.0 µm. They have such an average grain size, and high HcJ is easily obtained thereby. The grain size of the ferrite sintered magnet can be measured with a SEM or TEM.

In a section parallel to the axis of easy magnetization, when the number of total ferrite grains is N and the number of ferrite grains having a stacking fault is n, the ferrite sintered magnet according to the present embodiment satisfies $0 \leq n/N \leq 0.20$. Such a magnet is excellent especially in coercive force. n/N may be called a stacking fault ratio below. It is preferable that the n/N be 0.15 or less, and it is more preferable that the n/N be 0.07 or less.

n and N can be values in a TEM photograph in which, for example, around 50 to 100 ferrite grains are included. FIG. 1 is a schematic diagram of a TEM photograph of a section parallel to the axis of easy magnetization A. The c axis of the ferrite grains G is substantially parallel to the direction of the axis of easy magnetization A.

It is suitable to count the number of ferrite grains appearing wholly in the photograph like the ferrite grain G without counting ferrite grains appearing only partially in the photograph like the ferrite grain G' among N. That is, N can be the number of ferrite grains G appearing wholly in a TEM photograph of a section parallel to axis of easy magnetization A. Meanwhile, n is the number of grains having a linear light region or dark region in the grains among the above-mentioned ferrite grains G. Linear light regions or dark regions are called linear regions SF below. The length of a linear region SF can be 0.1 µm or more, is usually the size of a ferrite grain at the maximum, and does not extend out of the ferrite grain. Linear regions SF are usually perpendicular to the axis of easy magnetization A, or lean at angles of 45° or more to the axis of easy magnetization A. A plurality of linear regions SF may be included in one ferrite grain G. Linear regions SF correspond to stacking faults in crystals.

Although the reason why the ferrite sintered magnet according to the present embodiment satisfying the above-mentioned conditions of the n/N exhibits the improved coercive force is not clear, the inventor considers as follows.

A hexagonal ferrite such as a magnetoplumbite structure is subjected to the hexagonal closest packing by stacking oxygen ions like ABAB . . . . A stacking fault is a plane fault in which the order of the stack such as ABAB . . . is disturbed. It is considered that when a stacking fault exists, one ferrite grain is magnetically divided, the demagnetization factor therefore increases, and the coercive force decreases. It is considered that the high properties can be obtained by adjusting the stacking fault ratio to 0 to 0.19.

Method for Manufacturing Ferrite Sintered Magnet

An example of a method for manufacturing a ferrite sintered magnet according to the present embodiment will be shown hereinafter. The manufacturing method comprises a raw material powder preparation step, a calcination step, a pulverization step, a molding step and a firing step. The above-mentioned manufacturing method may comprise a finely pulverized slurry drying step and a kneading step between the above-mentioned pulverization step and the above-mentioned molding step, and may comprise a degreasing step between the above-mentioned molding step and the above-mentioned firing step. Steps will be described hereinafter.

Raw Material Powder Preparation Step

In the raw material powder preparation step, the raw materials of a ferrite sintered magnet are mixed to obtain a raw material mixture, and raw material powder is obtained by pulverizing this if needed. First, examples of the raw materials of the ferrite sintered magnet include compounds (raw material compounds) comprising one or two or more of the elements constituting the magnet. It is suitable that raw material compounds are, for example, powdered. Examples of the raw materials compounds include oxides of the elements and compounds which turn into oxides by firing (carbonates, hydroxides, nitrates or the like). Examples thereof include $SrCO_3$, $La_2O_3$, $Fe_2O_3$, $BaCO_3$, $CaCO_3$, $Co_3O_4$, $H_3BO_3$, $Al_2O_3$ and $SiO_2$.

It is preferable that the average primary particle size of an Fe compound be 0.5 µm or less, it is more preferable that the size be 0.4 µm or less, and it is further preferable that the size be 0.3 µm or less.

It is preferable that the average primary particle size of a Sr compound be 2.0 µm or less, it is more preferable that the size be 1.0 µm or less, and it is further preferable that the size be 0.5 µm or less.

It is preferable that the average primary particle size of a Ca compound be 1.0 µm or less, and it is more preferable that the size be 0.3 µm or less.

It is preferable that the average primary particle size of other raw material particles be 2 µm or less.

The average primary particle size can be defined as the D50 of the volume-based particle size distribution by a laser diffraction type particle size distribution device.

The primary particle size of a calcined body can be uniform by using fine raw material particles with equivalent particle size. As a result, the ratio of stacking faults can be reduced.

Raw materials are weighed, for example, so that the composition of a desired ferrite sintered magnet is obtained, and mixed; and then mixed and pulverized using a wet attritor or a ball mill around 0.1 to 20 hours. It is preferable that the average particle size of the powder of the raw material compounds be around 0.1 to 5.0 µm, for example, from the viewpoint of enabling uniform blending. The raw material powder comprises at least Ca, R, Sr, Fe, Co and B. The dependence of the magnetic properties of the ferrite sintered magnet on calcination temperature can be further reduced especially by incorporating B into the raw material powder. When the ferrite sintered magnet comprises Al, the raw material powder further comprises Al. Therefore, the grain growth in calcination can be suppressed, and the primary particle size of a calcined body can be reduced.

Some of the raw materials can be also added in the below-mentioned pulverization step. However, it is preferable that none of the raw materials be added in the pulverization step in the present embodiment. That is, it is preferable that all of Ca, R, Sr, Fe, Co and B constituting the obtained ferrite sintered magnet (except elements mixed inevitably) be supplied from the raw material powder in the raw material powder preparation step. It is preferable especially that all of B constituting the ferrite sintered magnet be supplied from the raw material powder in the raw material powder preparation step. It is preferable that all of Al constituting the ferrite sintered magnet be supplied from the raw material powder in the raw material powder preparation step. Therefore, the above-mentioned effects by incorporating B or Al into the raw material powder is more easily obtained.

Calcination Step

In the calcination step, the raw material powder obtained in the raw material powder preparation step is calcined. It is preferable that calcination be performed in an oxidizing atmosphere such as the air (atmosphere). It is preferable that the calcination temperature be in the temperature range of 1100 to 1400° C., it is more preferable that it be 1100 to 1300° C., and it is still more preferable that it be 1150 to 1300° C. In the method for manufacturing a ferrite sintered magnet according to the present embodiment, stable magnetic properties can be obtained even at any of the above-mentioned calcination temperatures. The calcination time (time for which it is maintained at the calcination temperature) can be 1 second to 10 hours, and it is preferable that it be 1 second to 5 hours. A calcined body obtained by calcination comprises the main phase (M phase) as mentioned above at 70% or more. The primary particle size of the calcined body is preferably 5 μm or less, more preferably 2 μm or less, and still more preferably 1 μm or less. The HcJ of the obtained ferrite sintered magnet can be further improved by suppressing grain growth in calcination and reducing the primary particle size of the calcined body (for example, to 1 μm or less).

Pulverization Step

In the pulverization step, the calcined body which has become granular or massive at the calcination step is pulverized to be powder again. Therefore, molding in the below-mentioned molding step is performed easily. In this pulverization step, raw materials which are not mixed in the raw material powder preparation step may be further added. However, it is preferable that all the raw materials be mixed in the raw material powder preparation step from the viewpoint of obtaining the effect of calcination temperature dependence or the effect of suppressing grain growth in calcination. The pulverization step may have two steps of pulverizing the calcined body into coarse powder (coarse pulverization) and then pulverizing this still finer (fine pulverization).

Coarse pulverization is performed to an average particle size of 0.5 to 5.0 μm, for example, using a vibrating mill or the like. In the fine pulverization, the coarsely pulverized material obtained by coarse pulverization is further pulverized by a wet attritor, a ball mill, a jet mill or the like. In fine pulverization, fine pulverization is performed so that the average particle size of the obtained finely pulverized material is preferably around 0.08 to 2.0 μm, more preferably around 0.1 to 1.0 μm, and still more preferably around 0.1 to 0.5 μm. It is preferable that the specific surface area of the finely pulverized material (determined, for example, by the BET method) be around 4 to 12 m²/g. Suitable pulverization time varies according to the pulverization method, and, for example, it is preferable that it be around 30 minutes to 20 hours in the case of a wet attritor and that it be around 10 to 50 hours in wet milling by a ball mill.

In the fine pulverization step, a nonaqueous dispersion medium such as toluene or xylene can be used besides water as a dispersion medium in the case of a wet method. When a nonaqueous dispersion medium is used, high orientation tends to be obtained at the time of the below-mentioned wet molding. Meanwhile, when an aqueous dispersion medium is used, it is advantageous from the viewpoint of productivity.

In the fine pulverization step, for example, a polyhydric alcohol represented by the formula $C_n(OH)_nH_{n+2}$ may be added as a dispersant to increase the orientation degree of the sintered body obtained after firing. As the polyhydric alcohol, it is preferable that the n be 4 to 100, it is more preferable that it be 4 to 30, it is still more preferable that it be 4 to 20, and it is particularly preferable that it be 4 to 12 in the formula. Examples of the polyhydric alcohol include sorbitol. Two or more polyhydric alcohols may be used in combination. In addition to the polyhydric alcohol, other well-known dispersants may be further used in combination.

When the polyhydric alcohol is added, it is preferable that the amount thereof added be 0.05 to 5.0% by mass, it is more preferable that it be 0.1 to 3.0% by mass, and it is still more preferable that it be 0.2 to 2.0% by mass on the basis of an object to which it is added (for example, the coarsely pulverized material). The polyhydric alcohol added in the fine pulverization step is removed by thermal decomposition in the below-mentioned firing step.

Molding Step

In the molding step, the pulverized material (preferably finely pulverized material) obtained after the pulverization step is molded in a magnetic field to obtain a green compact. Molding can be performed by either method of dry molding and wet molding. It is preferable to perform wet molding from the viewpoint of increasing the degree of magnetic orientation.

When molding is performed by wet molding, it is preferable, for example, to obtain slurry by performing the above-mentioned fine pulverization step by a wet process, then concentrate this slurry to a predetermined concentration to obtain slurry for wet molding, and perform molding using this. Concentration of slurry can be performed by centrifugal separation, a filter press or the like. It is preferable that finely pulverized material represent around 30 to 80% by mass of the total amount of the slurry for wet molding. In this case, a surfactant such as gluconic acid, gluconate or sorbitol may be added to the slurry. A nonaqueous dispersion medium may be used as the dispersion medium. As the nonaqueous dispersion medium, organic dispersion medium such as toluene and xylene can be used. In this case, it is preferable to add a surfactant such as oleic acid. The slurry for wet molding may be prepared by adding a dispersion medium and the like to dry finely pulverized material after fine pulverization.

In the wet molding, this slurry for wet molding is next molding in a magnetic field. In that case, it is preferable that molding pressure be around 9.8 to 49 MPa (0.1 to 0.5 ton/cm²), and it is preferable that the magnetic field to apply be around 398 to 1194 kA/m (5 to 15 kOe).

Firing Step

In the firing step, the green compact obtained in the molding step is fired into a sintered body. Therefore, a sintered body of the ferrite magnet as mentioned above, namely a ferrite sintered magnet, is obtained. Firing can be performed in an oxidizing atmosphere such as the air atmosphere. It is preferable that firing temperature be 1120 to 1270° C., and it is more preferable that it be 1150 to 1240° C. It is preferable that firing time (retention time at the firing temperature) be around 0.5 to 3 hours.

When the green compact is obtained by the wet molding as mentioned above, rapidly heating this green compact without full drying may volatilize the dispersion medium and the like extremely and crack the green compact. Then, it is preferable to suppress the occurrence of a crack, for example, by heating the green compact at a low rate of temperature increase of around 1° C./minute from room temperature to around 100° C. to fully dry it before it reaches the above-mentioned firing temperature from the viewpoint of avoiding such inconvenience. Additionally, when a surfactant (dispersant) and the like are added, it is preferable to fully remove them (degreasing treatment), for example, by heating the green compact at a rate of temperature increase of around 3° C./minute in the temperature range of around 100 to 500° C. These treatments may be performed at the start of the firing step, and may be performed before the firing step separately.

Additionally, it is preferable that the rate of temperature increase from 1100° C. to the firing temperature be 4° C./minute or less, it is more preferable that the rate be 3° C./minute or less, and it is further preferable that the rate be 1° C./minute or less. Meanwhile, it is preferable that the rate of temperature decrease from the firing temperature to 1100° C. be 6° C./minute or more, and it is more preferable that the rate be 10° C./minute or more. The stacking fault ratio is easily reduced by adjusting the rate of temperature increase at 1100° C. or more and the rate of temperature decrease to 1100° C. to the above-mentioned ranges.

The suitable method for manufacturing a ferrite sintered magnet was described above; however, as long as the ferrite sintered magnet of the present invention is manufactured, the manufacturing method is not limited to the manufacturing method described above, and conditions can be changed properly.

The shape of the ferrite sintered magnet is not particularly limited. The ferrite sintered magnet may have a plate shape such as a disk shape, may have a pillar shape such a round column or a quadrangular prism, may have a shape such as a C shape, a bow shape and an arch shape, and may have a ring shape.

The ferrite sintered magnet according to the present embodiment can be used, for example, for rotating machines such as motors and dynamos, various sensors and the like.

EXAMPLES

Although the present invention will be described still more specifically hereinafter, the present invention is not limited to the following Examples.

Manufacturing of Ferrite Sintered Magnet

Example 1

Raw Material Powder Preparation Step

As raw materials of metallic elements constituting a ferrite sintered magnet, calcium carbonate (CaCO$_3$) particles wherein the average primary particle size was 0.3 µm, lanthanum oxide (La$_2$O$_3$) particles, strontium carbonate (SrCO$_3$) particles wherein the average primary particle size was 0.5 µm, iron oxide (Fe$_2$O$_3$ comprising Mn, Cr, Al, Si and Cl as impurities) wherein the average primary particle size was 0.3 µm, and cobalt oxide (Co$_3$O$_4$) particles were provided. These raw materials were weighed so that approximately w=0.388, x=0.133, z=8.721, and m=0.247 in the ferrite sintered magnet comprising metallic elements at an atomic ratio represented by formula (1a) and mixed. Subsequently, boric acid (H$_3$BO$_3$) particles and alumina (Al$_2$O$_3$) particles were further provided as raw materials of the ferrite sintered magnet. Boric acid particles and alumina particles were weighed so that the content of boron was 0.144% by mass in terms of H$_3$BO$_3$ and the content of aluminum was 0.060% by mass in terms of Al$_2$O$_3$ on the basis of the whole obtained ferrite sintered magnet and added to the above-mentioned mixture. The obtained raw material mixture was mixed and pulverized in a wet attritor, and dried to obtain raw material powder.

$$Ca_{1-w-x}La_wSr_xFe_zCo_m \qquad (1a)$$

Calcination and Pulverization Steps

The raw material powder was calcined in the air atmosphere at 1200° C. for 2 hours to obtain a calcined body. The obtained calcined body was coarsely pulverized with a small rod vibrating mill so that the specific surface area determined by the BET method was 0.5 to 2.5 m$^2$/g. The obtained coarsely pulverized material was finely pulverized for 32 hours using a wet ball mill to obtain slurry for wet molding having finely pulverized particles wherein the specific surface area determined by the BET method was 7.0 to 10 m$^2$/g. The slurry for wet molding was obtained by dewatering the slurry after fine pulverization with a centrifuge, and adjusting the solid content concentration to 70 to 80% by mass.

Molding and Firing Steps

The slurry for wet molding was molded in an applied magnetic field of 10 kOe using a wet magnetic field molding machine to obtain a cylindrical green compact measuring 30 mm in diameter×15 mm in thickness. The obtained green compact was fully dried in the air atmosphere at room temperature. Subsequently, firing in which the temperature was raised in the air atmosphere, the temperature was raised at 1.0° C./minute especially at 1100° C. or more, maintained at 1205° C. for 1 hour, then lowered to 1100° C. at 10.0° C./minute, and then lowered to room temperature was performed to obtain the ferrite sintered magnet of Example 1.

Example 2

In the raw material powder preparation step, the ferrite sintered magnet of Example 2 was obtained in the same way as in Example 1 except that Fe$_2$O$_3$ particles wherein the average primary particle size was 0.4 µm was substituted for Fe$_2$O$_3$ particles wherein the average primary particle size was 0.3 µm, and SrCO$_3$ particles wherein the average primary particle size was 1.0 μm was substituted for $SrCO_3$ particles wherein the average primary particle size was 0.5 μm.

Example 3

In the raw material powder preparation step, the ferrite sintered magnet of Example 3 was obtained in the same way as in Example 2 except that $Fe_2O_3$ particles wherein the average primary particle size was 0.5 μm was substituted for $Fe_2O_3$ particles wherein the average primary particle size was 0.3 μm, $SrCO_3$ particles wherein the average primary particle size was 2.0 μm was substituted for $SrCO_3$ particles wherein the average primary particle size was 0.5 μm, and $CaCO_3$ particles wherein the average primary particle size was 1.0 μm was substituted for $CaCO_3$ particles wherein the average primary particle size was 0.3 μm.

Comparative Example 1

The ferrite sintered magnet of Comparative Example 1 was obtained in the same way as in Example 3 except that the rate of temperature increase at 1100° C. or more was 5.0° C./minute, the firing temperature was 1220° C., and the rate of temperature decrease to 1100° C. was 5.0° C./minute in the firing step.

Evaluation Method

Stacking Fault Ratio

Figure 2:
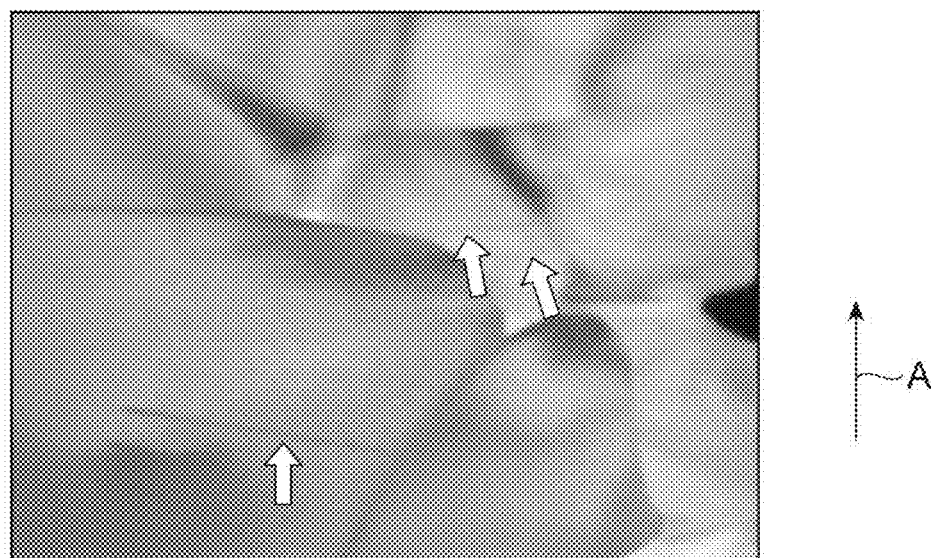
FIG. 2 is a TEM photograph of a section parallel to the direction of the axis of easy magnetization of the ferrite sintered magnet of Example 2, and the axis of easy magnetization is the direction A of the figure.

A TEM photograph of a section parallel to the axis of easy magnetization of the magnet of each Example was taken. The range of the image was 4 μm height and 7.4 μm wide, and the vertical direction was the axis of easy magnetization. The number N of ferrite grains wherein the whole regions appeared in the range of the image was counted, the number n of grains having a linear region in the grains among N was then counted, and n/N, which was a stacking fault ratio, was calculated. An example of an TEM photograph in Example 2 is shown in FIG. 2. A white arrow shows an example of linear regions SF.

Magnetic Properties

The upper and lower sides of each cylindrical ferrite sintered magnet obtained by Examples and Comparative Examples were processed, then the residual magnetic flux densities Br (mT) and coercive forces HcJ (kA/m) thereof were measured, and external magnetic field intensities (Hk) when the magnetic flux densities were 90% of the Br were measured using a B—H tracer at a maximum applied magnetic field of 25 kOe. The squareness ratio Hk/HcJ was calculated from the measurement results of Hk and HcJ.

The analyzed composition, manufacturing conditions, n/N and magnetic properties of the products are shown in Table 1.

TABLE 1

| | | | Example 1 | Example 2 | Example 3 | Comparative Example 1 |
|---|---|---|---|---|---|---|
| Composition | $Ca_{1-w-x}La_wSr_xFe_zCo_m$ | 1 − w − x | 0.479 | 0.478 | 0.478 | 0.478 |
| | | w | 0.388 | 0.388 | 0.390 | 0.390 |
| | | x | 0.133 | 0.134 | 0.132 | 0.132 |
| | | z | 8.721 | 8.740 | 8.772 | 8.772 |
| | | m | 0.247 | 0.247 | 0.249 | 0.249 |
| | $Al_2O_3$ (wt %) | | 0.060 | 0.060 | 0.112 | 0.112 |
| | $H_3BO_3$ (wt %) | | 0.144 | 0.144 | 0.144 | 0.144 |
| Raw material primary particle size | $Fe_2O_3$ (μm) | | 0.3 | 0.4 | 0.5 | 0.5 |
| | $SrCO_3$ (μm) | | 0.5 | 1.0 | 2.0 | 2.0 |
| | $CaCO_3$ (μm) | | 0.3 | 0.3 | 1.0 | 1.0 |
| Firing conditions | Rate of temperature increase at 1100° C. or more (° C./minute) | | 1 | 1 | 1 | 5 |
| | Firing temperature (° C.) | | 1205 | 1205 | 1205 | 1220 |
| | Retention time (minute) | | 60 | 60 | 60 | 60 |
| | Rate of temperature decrease to 1100° C. (° C./minute) | | 10 | 10 | 10 | 5 |
| Stacking fault ratio n/N | | | 0.066 | 0.149 | 0.195 | 0.237 |
| Br (mT) | | | 452.8 | 452.1 | 449.8 | 450.0 |
| Hcj (kA/m) | | | 501.9 | 496.5 | 487.6 | 467.6 |
| Hk/Hcj (%) | | | 88.6 | 86.6 | 82.9 | 78.5 |

In Examples wherein the stacking fault ratio n/N was low, improvement in coercive force was especially found as compared with Comparative Example.

REFERENCE SIGNS LIST

G: ferrite grains, SF: linear region.

What is claimed is:

1. A ferrite sintered magnet comprising ferrite grains having a hexagonal structure,
wherein the ferrite sintered magnet comprises metallic elements at an atomic ratio represented by formula (1):

$$Ca_{1-w-x}R_wSr_xFe_zCo_m \quad (1)$$

in formula (1), R is at least one element selected from the group consisting of rare-earth elements and Bi, and R comprises at least La, in formula (1), w, x, z and m satisfy formulae (2) to (5):

$$0.360 \leq w \leq 0.420 \quad (2)$$

$$0.110 \leq x \leq 0.173 \quad (3)$$

$$8.51 \leq z \leq 9.71 \quad (4)$$

$$0.208 \leq m \leq 0.269 \quad (5), \text{and}$$

in a section parallel to an axis of easy magnetization, when a number of total ferrite grains is N and a number of ferrite grains having a stacking fault is n, $0 \leq n/N \leq 0.20$ is satisfied.

2. The ferrite sintered magnet according to claim 1, further comprising 0.03 to 0.3% by mass of Al in terms of $Al_2O_3$.

3. The ferrite sintered magnet according to claim 1, further comprising 0.037 to 0.181% by mass of B in terms of $H_3BO_3$.

4. The ferrite sintered magnet according to claim 2, further comprising 0.037 to 0.181% by mass of B in terms of $H_3BO_3$.

* * * * *